United States Patent
Kawanabe

(10) Patent No.: US 7,424,625 B2
(45) Date of Patent: Sep. 9, 2008

(54) PRINTING APPARATUS AND POWER SUPPLY CONTROL METHOD IN PRINTING APPARATUS

(75) Inventor: Tetsuya Kawanabe, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 396 days.

(21) Appl. No.: 10/800,662

(22) Filed: Mar. 16, 2004

(65) Prior Publication Data
US 2004/0187042 A1 Sep. 23, 2004

(30) Foreign Application Priority Data
Mar. 20, 2003 (JP) .............................. 2003-078373

(51) Int. Cl.
G06F 1/26 (2006.01)
G06F 1/32 (2006.01)
G06F 1/28 (2006.01)

(52) U.S. Cl. ....................... 713/300; 713/310; 713/320; 713/321; 713/322; 713/323; 713/324; 713/330; 713/340

(58) Field of Classification Search ................. 713/300, 713/310, 320–324, 330, 340
See application file for complete search history.

(56) References Cited

U.S. PATENT DOCUMENTS

| 5,483,656 | A  | * | 1/1996 | Oprescu et al. ............. 713/320 |
| 6,256,516 | B1 | * | 7/2001 | Wagner et al. .............. 455/565 |
| 6,526,516 | B1 | * | 2/2003 | Ishikawa et al. ............ 713/340 |
| 7,114,078 | B2 | * | 9/2006 | Carman ...................... 713/185 |
| 2003/0067620 | A1 |   | 4/2003 | Masumoto et al. |
| 2003/0070103 | A1 | * | 4/2003 | Kim ........................... 713/300 |

FOREIGN PATENT DOCUMENTS

JP 2003-200621 7/2003

* cited by examiner

Primary Examiner—Rehana Perveen
Assistant Examiner—Fahmida Rahman
(74) Attorney, Agent, or Firm—Fitzpatrick, Cella, Harper & Scinto

(57) ABSTRACT

A printing apparatus is equipped with multiple interfaces adapted to connect external devices adapted to store image data and operated by power supplied from a first-connected external device, and is adapted to print images stored in the external devices. The state of the connection of the external devices to the plurality of interfaces is detected and, when it is determined that a plurality of external devices are connected to the printing apparatus, a determination is made as to whether or not an amount of power required by the plurality of external devices exceeds the amount of power the printing apparatus is capable of supplying. If the amount of power requested exceeds capacity, then the apparatus selects which external device to supply with power depending on the operating state of the first-connected external device.

3 Claims, 14 Drawing Sheets

PRINTING APPARATUS AND POWER SUPPLY CONTROL METHOD IN PRINTING APPARATUS

FIELD OF THE INVENTION

The present invention relates to a printing apparatus and a power supply control method in a printing apparatus, and more particularly, to power supply to external devices in a printing apparatus that is provided with a plurality of interface means connectible to external devices adapted to store image data and operated by power supplied from a first-connected source, the printing apparatus being adapted to print images stored in the external devices.

BACKGROUND OF THE INVENTION

As an information output apparatus for, for example, word processors, personal computers, facsimile machines and the like, printers are widely used to print desired text and image information onto a sheet-like printing medium such as paper or film.

As a printer use embodiment, it is common for printing to be executed by connecting the printer to a host device such as a personal computer, processing the image and text data to be printed into a suitable embodiment for printing at the printer by a printer driver installed in the host device, and transmitting the data to the printer together with control data.

Recently, with the rapid rise in popularity of the digital camera, embodiments thereof have come to range from types that can accommodate interchangeable lenses from single lens reflex, silver halide (i.e., traditional film) cameras to compact, lightweight models that place a premium on portability.

With the spread of digital input devices such as the digital camera, so-called direct printers, which have an interface for a storage medium that stores image data of an external device such as a digital camera or of a memory card and the like, and which execute printing by directly scanning an image from the external device without going through the host device, have attracted notice.

In a printing apparatus of the type described above, ordinarily, a standard is adopted in which the device is configured so that it is possible to supply power via a connection cable such as a USB that is the interface with the external device, with the power necessary to operate that device being supplied when it is detected that an external device is connected.

Accordingly, if a plurality of external devices is connected simultaneously to such a printing apparatus, it is therefore necessary to supply power to those devices simultaneously as well. As a result, the power circuit for this type of printing apparatus must be a large-capacity power unit, capable of reliably supplying power for consumption not only to the printing apparatus itself but also power for consumption to the connectible external devices, resulting in large power costs for such apparatus.

Moreover, in order to increase power unit capacity the power unit itself becomes larger, thus increasing the size of the apparatus as a whole, which is undesirable.

SUMMARY OF THE INVENTION

Accordingly, the present invention is conceived as a response to the above-described disadvantages of the conventional art, and has as its object, in a printing apparatus to which a plurality of external devices can be connected simultaneously, to make it possible to efficiently select an external device or devices to be supplied with power when the sum total of the power required by the external devices connected to the printing apparatus exceeds the amount of power that can be supplied by the printing apparatus at any given time.

In other words, it is an object of the present invention to provide a printing apparatus and a control method for the printing apparatus that make it possible to supply to at least a later-connected external device the power required by that device, from the relation between the sum total of the amount of power required by external devices connected to the printing apparatus and the total power supply capacity of the printing apparatus.

Another object of the present invention is to provide a printing apparatus and a control method for the printing apparatus that can provide a user with the ability to switch selection of the power supply source depending on the relation between an amount by which the amount of power supplied to the later-connected external device is exceeded, on the one hand, and the amount of power that the printing apparatus is capable of supplying on the other, according to the amount of power supplied to the external devices connected to the printing apparatus and the operating state of the external devices.

In order to achieve the above-described object, a printing apparatus according to one embodiment of the present invention is a printing apparatus provided with a plurality of interface means connectible to external devices adapted to store image data and operated by power supplied from a first-connected external device, the printing apparatus adapted to print images stored in the external devices, the printing apparatus comprising: connection detection means for detecting a connection state of the external devices to the respectively plurality of interface means; determining means for determining whether or not a total amount of power that the plurality of external devices demands exceeds an amount of power that the printing apparatus is capable of supplying when the detection means detects that a plurality of external devices are connected; and selection means for selecting an external device to be supplied with power according to an operating state of a first-connected external device when the determining means determines that the total amount of power required exceeds the amount of power that the printing apparatus is capable of supplying.

In other words, in the present invention, in a printing apparatus that is provided with a plurality of interface means connectible to external devices adapted to store image data and operated by power supplied from a first-connected source, in which the printing apparatus is adapted to print images stored in the external devices, the printing apparatus detects a connection state of the external devices to the respective plurality of interface means, and, when the printing apparatus detects that a plurality of external devices is connected, the printing apparatus determines whether or not the sum total of the amount of power required by the plurality of external devices exceeds the amount of power that the printing apparatus is capable of supplying, and, if the printing apparatus determines that the sum total amount of power exceeds the amount of power that the printing apparatus is capable of supplying, the printing apparatus selects the external device(s) to which power is to be supplied according to the operating state of a first-connected external device.

By so doing, when a plurality of external devices is connected to the printing apparatus and the amount of power that the printing apparatus is capable of supplying is less than the total amount of power required by the plurality of external devices, then the external devices to which power is to be supplied are selected according to the operating state of the first-connected external device, and the external devices to which power is to be supplied can be switched as necessary.

Accordingly, the size and cost of the power unit for the printing apparatus can be restricted without decreasing operability and performance, with the additional advantage of decreasing the size and cost of the apparatus as a whole.

When the first-connected external device is in an idle state, the selection means may stop power supply to such idle external device and starts power supply to a later-connected external device.

After starting power supply to a later-connected external device, the selection means may re-start power supply to a first-connected external device when such later-connected external device enters a non-connected state.

The selection means may comprise notice means for notifying a user that a later-connected external device cannot be used when a first-connected external device is in operation.

The selection means may comprise user selection means for allowing a user to select a usable external device.

The interface means may comprise a plurality of interfaces of different specifications. For example, the interface means comprises a memory card interface, a USB interface or an IEEE 1394 interface.

Further, above object of the present invention can be attained by a printing apparatus provided with a plurality of interface means adapted to supply power to external devices, the printing apparatus adapted to print images stored in the external devices, the printing apparatus comprising: connection detection means for detecting a connection state of the external devices to the respectively plurality of interface means; determining means for determining whether or not a total amount of power that the plurality of external devices demands exceeds an amount of power that the printing apparatus is capable of supplying when the detection means detects that a plurality of external devices are connected; and selection means for selecting an external device to be supplied with power according to an operating state of a first-connected external device when the determining means determines that the total amount of power required exceeds the amount of power that the printing apparatus is capable of supplying.

Moreover, in addition to the above-described embodiment as a printing apparatus, the present invention can also be achieved in embodiments such as a power supply control method in a printing apparatus, a computer program that implements such method on a computer, and a storage medium storing such a computer program.

Other features and advantages of the present invention will be apparent from the following description when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

A preferred embodiment of the present invention is now described in detail in accordance with the accompanying drawings.

In the following embodiment, a printing apparatus utilizing and inkjet printing system is explained as an example.

In this specification, "print" is not only to form significant information such as characters and graphics, but also to form, e.g., images, figures, and patterns on printing media in a broad sense, regardless of whether the information formed is significant or insignificant or whether the information formed is visualized so that a human can visually perceive it, or to process printing media.

"Print media" are any media capable of receiving ink, such as cloth, plastic films, metal plates, glass, ceramics, wood, and leather, as well as paper sheets used in common printing apparatuses.

Furthermore, "ink" (to be also referred to as a "liquid" hereinafter), should be broadly interpreted like the definition of "print" described above. That is, ink is a liquid which is applied onto a printing medium and thereby can be used to form images, figures, and patterns, to process the printing medium, or to process ink (e.g., to solidify or insolubilize a colorant in ink applied to a printing medium).

Moreover, "connection" means not only physically connecting two devices but also making electrically communicable, whether that which is connected is mechanical/physical means, interfaces, or protocols.

Figure 1:
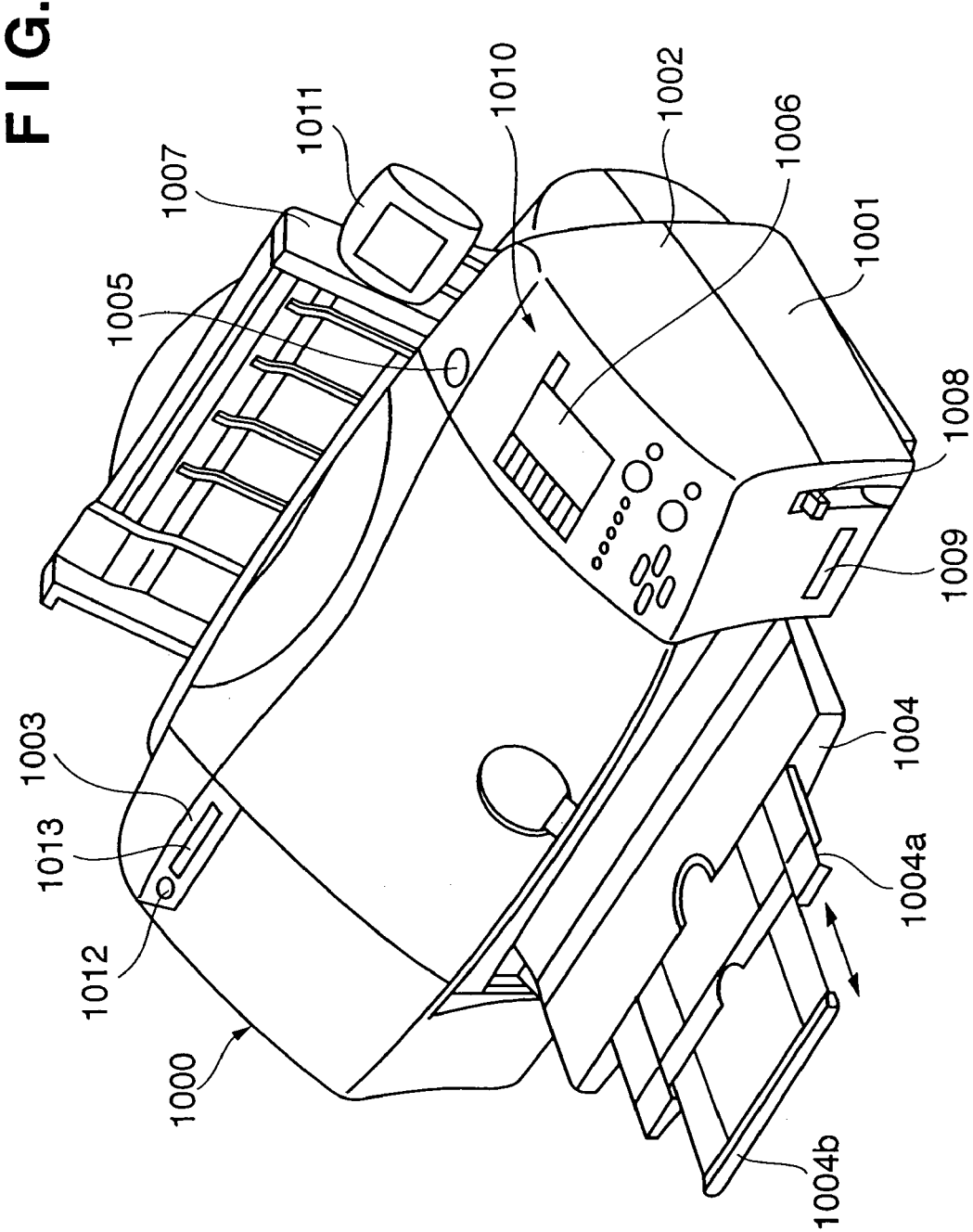
FIG. 1 is a diagram showing a schematic oblique view of a photodirect printer according to an embodiment of the present invention.

FIG. 1 is a diagram showing a schematic oblique view of a photodirect printer 1000 according to an embodiment of the present invention. The photodirect printer 1000 is provided with the capability to function as a typical PC printer for receiving and printing data from a host computer (that is, a PC) as well as the ability to directly scan and print image data stored on a storage medium such as a memory card or to directly receive and print image data from a digital camera.

In FIG. 1, the housing that forms the shell of the photodirect printer 1000 has as external members a lower case 1001, an upper case 1002, an access cover 1003 and a discharge tray 1004. In addition, the lower case 1001 forms approximately the lower half of the apparatus 1000 and the upper case 1002 forms approximately the upper half of the apparatus. 1000, respectively. The combination of both cases forms an empty structure having a storage space for accommodating therein mechanisms to be described later, with openings formed in the upper and front surfaces thereof, respectively. Further, one end of the discharge tray 1004 is rotatably supported by the lower case 1001, such rotation opening and closing the opening formed in the front surface of the lower case 1001. For this reason, when executing a printing operation, the discharge tray 1004 is rotated toward the front so as to open the opening, from which a printing sheet can be discharged and at the same time the discharged sheets can be successively accumulated. In addition, two auxiliary trays 1004a and 1004b are contained within the discharge tray 1004, such that they can be pulled outward as necessary and provide an expandable/contractable 3-stage support surface for the discharged paper.

One end of the access cover 1003 is rotatably supported by the upper case 1002, so as to open and close the opening formed in the top surface. By opening the access cover 1003, a printhead cartridge (not shown) or an ink tank (not shown) can be replaced. It should be noted that, although not specifically shown, opening and closing the access cover 1003 causes a projection formed on a back surface thereof to rotate a cover open/close lever. By detecting the rotation position of that lever using a micro switch or the like, the state of the access cover (that is, whether open or closed) can be detected.

A power key 1005 that can be pressed is provided on the top surface of the upper case 1002. In addition, a control panel 1010 equipped with a liquid crystal display (LCD) unit 1006 and a variety of switches is provided on a right lateral surface of the upper case 1002. A detailed description, with reference to FIG. 3, of the structure of this control panel 1010 is deferred. Reference numeral 1007 denotes an automatic feed unit, which automatically feeds printing sheets into the apparatus main unit. Reference numeral 1008 denotes a paper interval selection lever, for adjusting the space between the printhead and the printing sheets. Reference numeral 1009 denotes a card slot, into which a memory card can be inserted and image data stored in the memory card read and printed. The memory card (that is, the external storage medium) may, for example, be a compact flash memory, SmartMedia, Sony's Memory Stick or the like. Reference numeral 1011 denotes a viewer (that is, color display unit), which is used, for example, when searching for an image that one wishes to have printed from among the images stored on the memory card and displays images one frame at a time or an index image, or, alternatively, to display operating instructions or the state of the photodirect printer 1000 in the form of icons and/or text. Reference numeral 1012 denotes a (type A) USB bus connector for connecting a digital camera to be described later, and reference numeral 1013 denotes a (type B) USB bus connector for connecting a personal computer (PC).

Figure 2:
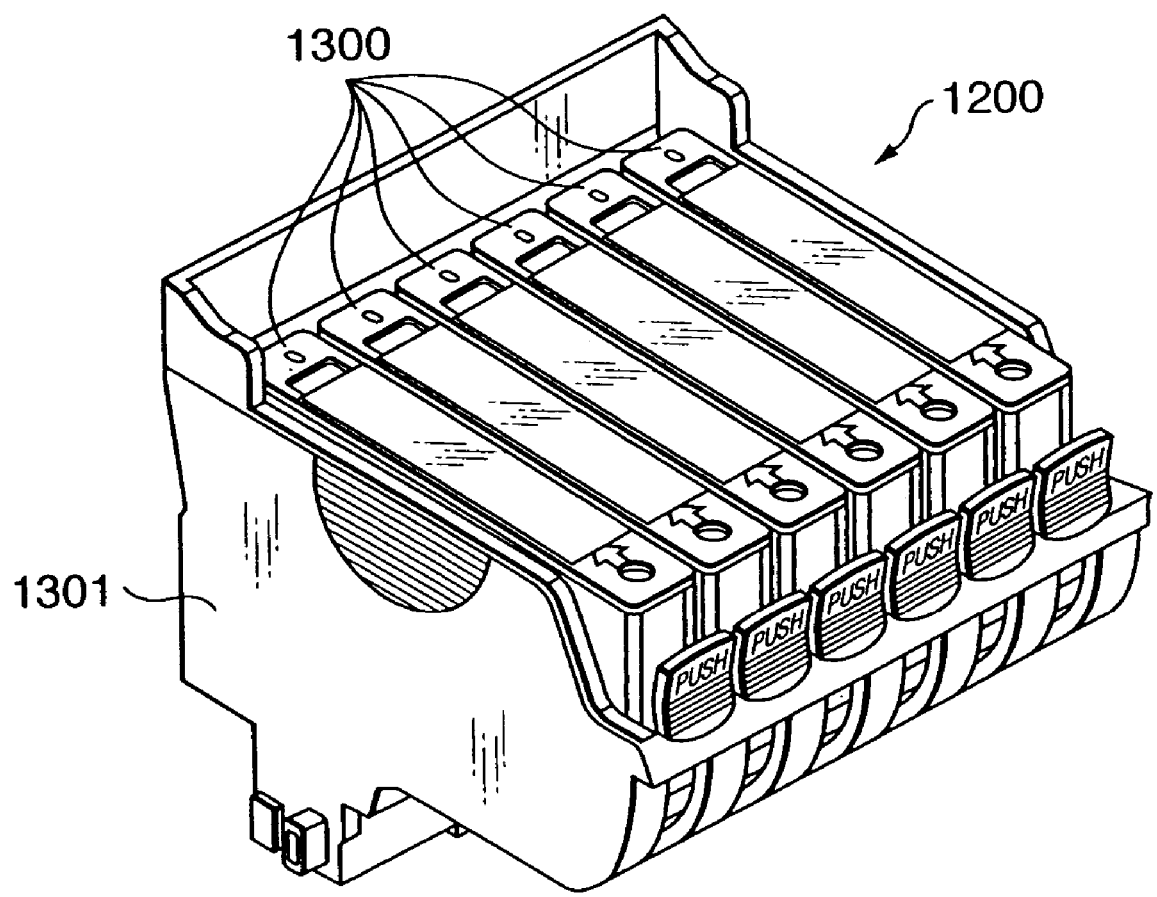
FIG. 2 is a diagram showing a schematic oblique view of a printhead of the photodirect printer of FIG. 1.

FIG. 2 is a diagram showing a schematic oblique view of a printhead of the photodirect printer 1000 of FIG. 1.

The printhead cartridge 1200 in the present embodiment, as shown in FIG. 2, is comprised of ink tanks 1300 for storing ink and a printhead 1301 that discharges ink supplied from the ink tanks 1300 from nozzles, according to the printing information. The printhead 1301 is a so-called cartridge-type printhead, detachably mounted on a carriage 1102. When printing, the printhead cartridge 1200 scans back and forth along the carriage axis, and in so doing a color image is printed onto the printing sheet. The printhead cartridge 1200 shown here, in order to be able to provide picture-quality color printing, is provided with separate ink tanks for, for example, the colors black, light cyan (LC), light magenta (LM), cyan, magenta and yellow, each of which is detachably attached to the printhead 1301.

It should be noted that, although the present embodiment is described in terms of the 6 colors of ink described above, the present invention is not limited to the use of these 6 colors. Thus, for example, an inkjet printer that uses the 4 colors, black, cyan, magenta and yellow, to carry out printing can achieve the present invention. In this case, 4 separate ink tanks for each of the 4 colors may each be detachably attached to the printhead 1301.

Figure 3:
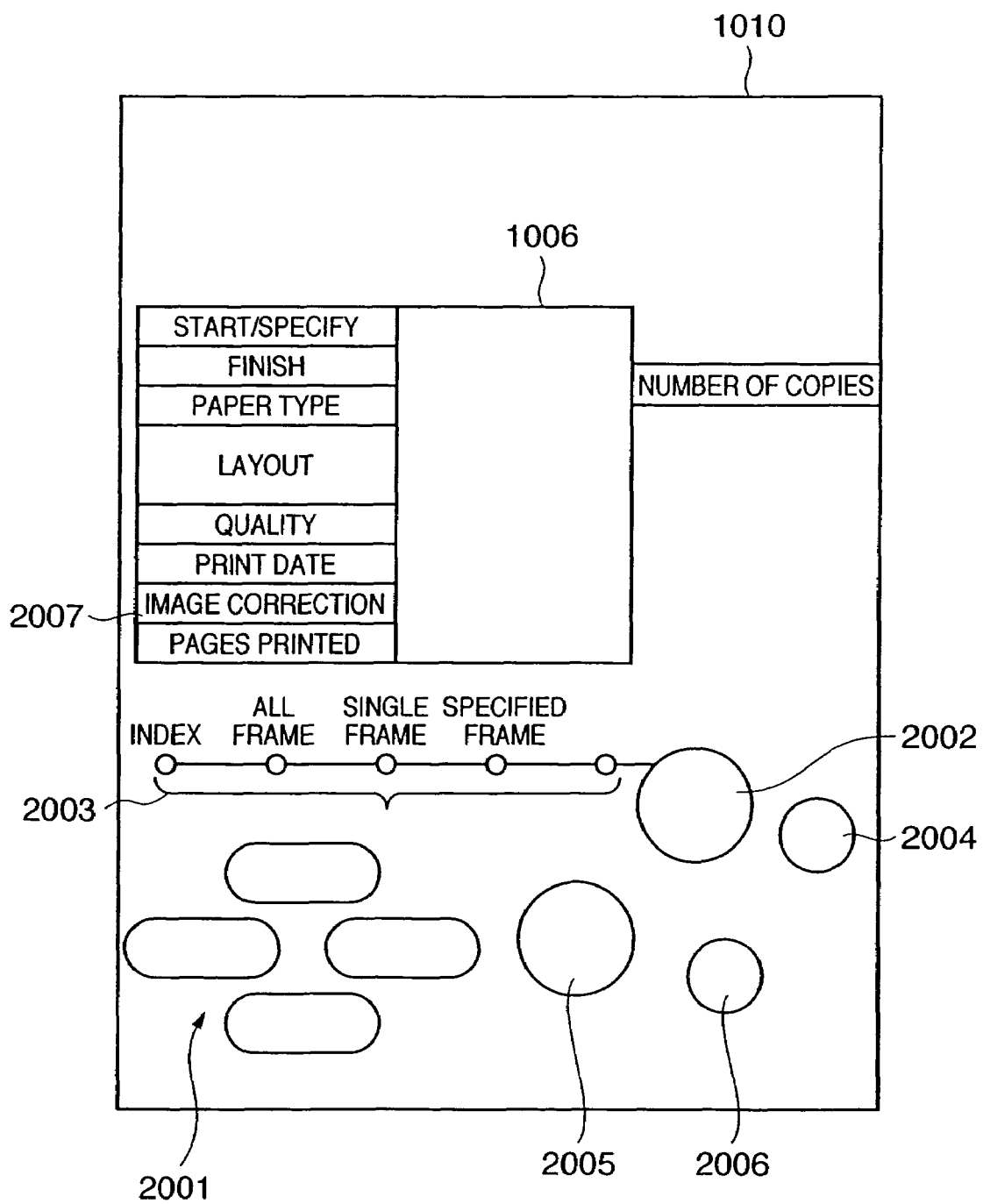
FIG. 3 is a diagram showing a schematic view of the control panel of the photodirect printer of FIG. 1.

FIG. 3 is a diagram showing a schematic view of the control panel of the photodirect printer of FIG. 1.

As shown in the diagram, a menu for setting data concerning items being printed is displayed at the LCD unit 1006. The menu may include such items 2007 as the lead photo number of the range one wishes to print, a specified frame number (START/SPECIFY), the last photo number of the range one wishes to finish printing (FINISH), the number of copies to be printed (NUMBER OF COPIES), the type of paper (printing sheets) to be used for printing (PAPER TYPE), setting the number of photos to be printed on one sheet of paper (LAYOUT), specifying the level of quality of the printing (QUALITY), specifying whether or not to print the date the photograph was taken (PRINT DATE), specifying whether or not to print the photo after correction (IMAGE CORRECTION), displaying the number of pages needed for printing (NUMBER OF PAGES), and so forth.

Each of these items is selected or specified using cursor keys 2001. Reference numeral 2002 denotes a mode key that enables the user to switch between different types of printing (that is, for example, index printing, all-frame printing, single-frame printing, etc.), with an LED among the LED 2003 corresponding to the type of printing selected lighting up. A key 2004 is a maintenance key, used for cleaning the printhead 1301 shown in FIG. 2 or for performing maintenance on the printer 1000. Reference numeral 2005 denotes a print start key, and is pressed to direct the apparatus to start printing or to confirm the maintenance settings. Reference numeral 2006 denotes a print stop key, pressed when stopping printing or instructing the apparatus to stop maintenance.

Figure 4:
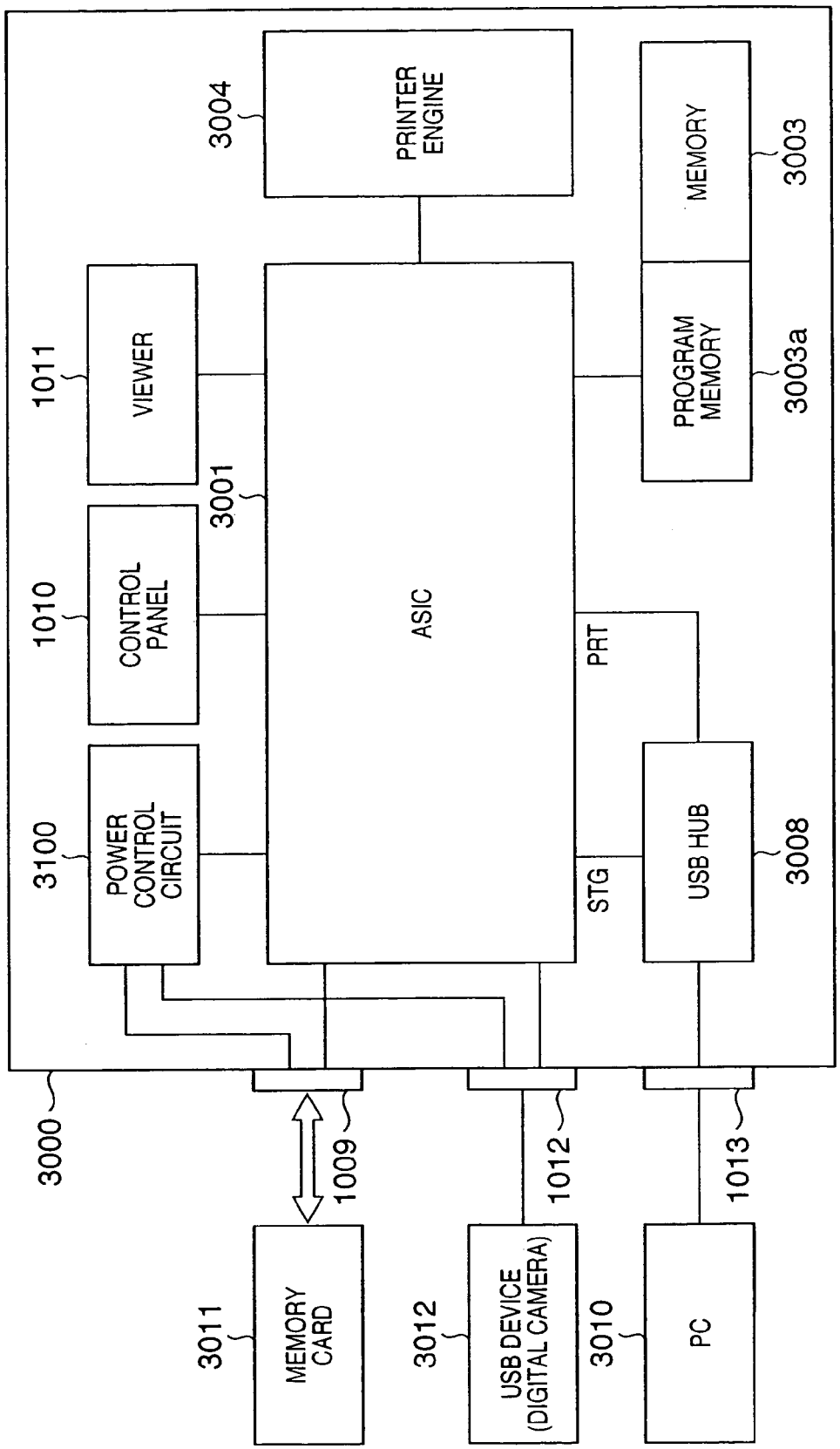
FIG. 4 is a block diagram showing the structure of the main elements of control of the photodirect printer of FIG. 1.

Next, using FIG. 4, a description is given of the main components of the control of the photodirect printer 1000 according to the present embodiment. It should be noted that parts which are the same as those described in the preceding diagrams are assigned the same reference numeral and a description thereof is omitted.

In FIG. 4, reference numeral 3000 denotes a control unit (that is, a control board). Reference numeral 3001 denotes an application-specific integrated circuit (ASIC), that is, a customized LSI (large scale integration), the structure of which is described later with reference to the block diagram of FIG. 5. The ASIC 3000 contains the central processing unit (CPU) and performs all types of control processing to be described later, as well as operations input control processing from the control panel 1010, image processing such as converting brightness signals (RGB) into density signals (CMYK), scaling, gamma conversion and error diffusion, display control such as image display and status display to the viewer 1011, and further, mechanism control such as scanning control and paper feed control of the printhead cartridge 1200 of a printer engine 3004 as well as printing output control, such as of a desired photo image. Reference numeral 3003 is a memory, and is comprised of a program memory 3003a for storing a control program of the above-described CPU, a RAM area for storing a program during execution, and a memory area that functions as a work memory for storing image data and the like.

Reference numeral 3004 denotes the printer engine, where an inkjet printer engine that prints color images using multicolored ink is mounted. Reference numeral 1012 denotes a (type A) USB bus connector, which acts as a port for connecting a USB device 3012 such as a digital camera. Reference numeral 1009 denotes a card slot for inserting a memory card 3011. Reference numeral 3100 denotes a power control circuit for controlling the supply of electrical power to the memory card 3011 and the USB device 3012. Reference numeral 1013 is a (type B) USB bus connector, which acts as a port for connecting a PC 3010 (that is, an ordinary personal computer) and the printer 1000.

Reference numeral 3008 denotes a USB bus hub (USB HUB). When the printer 1000 carries out printing based on image data from the PC 3010, the image data from the PC 3010 is put through as is to that which is designated PRT in the diagram so as to output a desired text/image to the printer engine 3004 via the USB bus. By so doing, the connected PC 3010 can execute printing by communicating data and signals directly to the printer engine 3004. That is, the PC 3010 can also function (operate) as an ordinary PC printer. In addition, the USB bus hub 3008 puts storage data from the PC 3010 through to that which is designated STG in the diagram so as to provide read/write access from the PC 3010 to the memory card 3011 via the USB bus.

Figure 5:
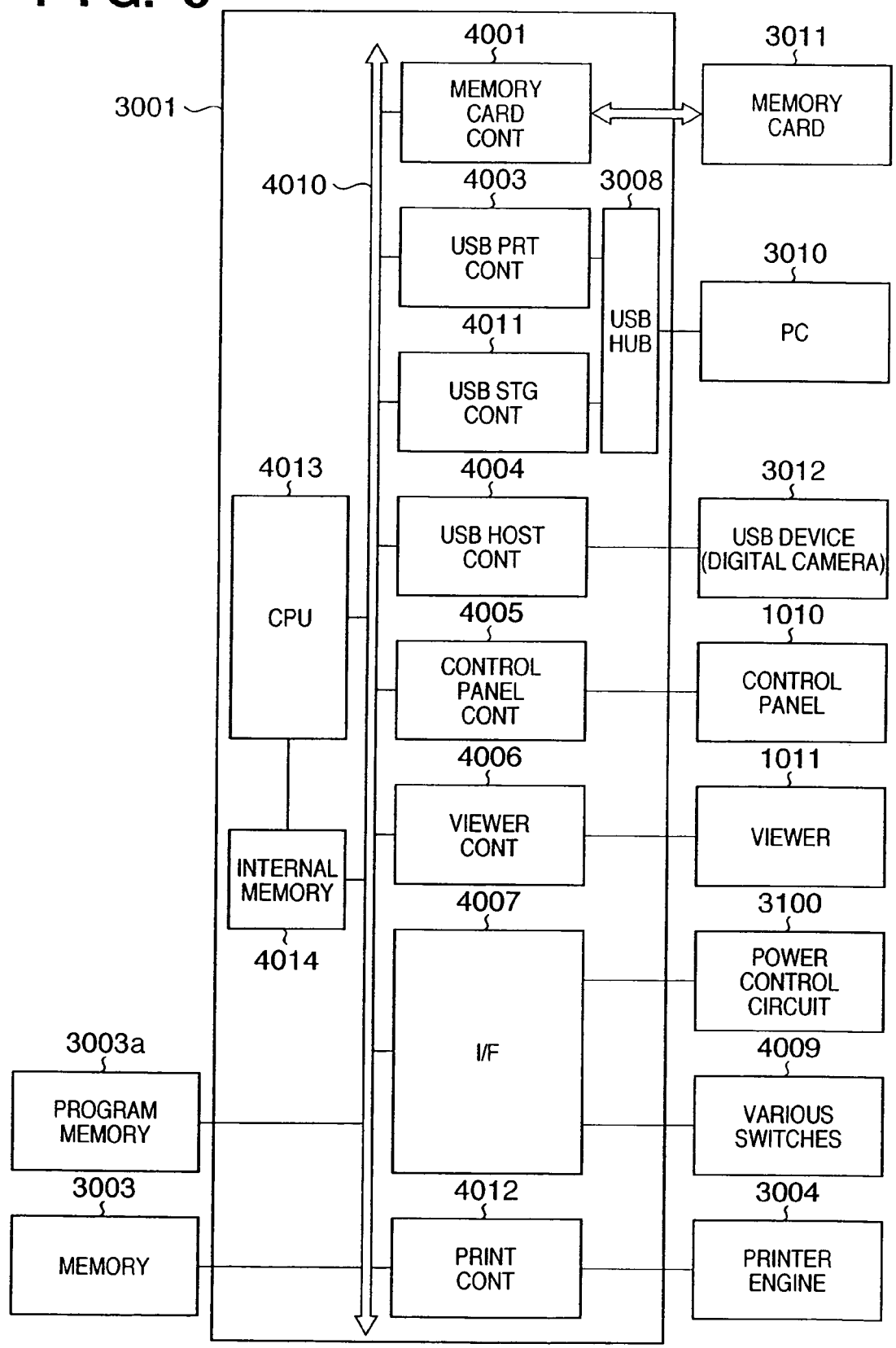
FIG. 5 is a block diagram showing the structure of the application-specific integrated circuit (ASIC) of FIG. 4.

FIG. 5 is a block diagram showing the structure of the ASIC of FIG. 4. In FIG. 5 as well, parts identical to those in previous diagrams are assigned identical reference numerals and a discussion thereof is omitted.

Reference numeral 4001 denotes a memory card control unit, which reads image data stored in a mounted memory card 3011 or writes (stores) data to the memory card 3011. Reference numeral 4003 denotes a first USB interface control unit, which exchanges print data with the PC 3010. Reference numeral 4011 denotes a second USB interface control unit, which exchanges with the PC 3010 data read from the memory card 3011 or the writing of data to the memory card 3011. Reference numeral 4004 denotes a USB host interface control unit, which exchanges data with a USB device such as a digital camera 3012.

Reference numeral 4005 denotes a control panel control unit, which inputs the various operating signals from the control panel 1010 and outputs display data to the LCD unit 1006. Reference numeral 4006 denotes a viewer control unit, which controls the display of image data to the viewer 1011. Reference numeral 4007 denotes an interface unit that controls the power control circuit 3100 and the various switches and LEDs 4009. Reference numeral 4012 denotes a printer control unit, which controls the printing operations of the printer engine 3004 and prints image data stored in the USB 3012 such as a digital camera or CD-R/RW drive or the memory card 3011. Reference numeral 4013 denotes the CPU, which can connect to an internal memory 4014 that can be accessed at high speed via a local bus and can carry out the image processing described above at high speed. Reference numeral 4010 denotes an internal bus (ASIC) bus that connects the foregoing parts.

It should be noted that although in the present embodiment the above-described parts are configured as a single ASIC chip, alternatively, the CPU, for example, may be constituted as a separate chip, or the above-described parts may each have their own chip and the whole comprised of a plurality of chips. Additionally, although the embodiment described above is configured so that two physically separate ports, USB PRT 4003 and USB STG 4011, can be connected to the PC 3010 via the USB bus hub 3008, alternatively for example, the USB PRT 4003 and USB STG 4011 may be combined in a multi-interface arrangement, thereby making it possible to eliminate the USB bus hub 3008.

A description is now given of the general operation of the structure described above. In the photodirect printer 1000 according to the present embodiment, images can be printed in the following three printing modes.

(Ordinary PC Printer Mode)

This mode involves printing images based on data sent from the PC 3010, that is, a printing mode as an ordinary PC printer.

In the ordinary PC printer mode, when data from the PC 3010 in FIG. 4 is input via a connector 1013, it is sent to the USB interface control unit 4003 in the ASIC 3001 via the USB hub bus 3008, the print control unit 4007 activates the printer engine 3004 and printing is carried out based on the data from the PC 3010. That is, through the PC 3010 memory card, hard disk or a network such as the internet, the operator (that is, the user) can input image data such as digital photographs that the user wishes to print and can print the desired images by outputting the image data to the photodirect printer 1000.

(Direct Print from Memory Card Mode)

An interruption occurs whenever the memory card 3011 is either inserted into or removed from the card slot 1009, by which the memory card control unit 4001 can detect if the memory card 3011 is either installed or removed.

When the memory card 3011 is mounted, the compressed (for example, JPEG-compressed) image data stored in the memory card 3011 is read and stored into the memory 3003. Thereafter, the compressed image data is unfrozen and once again stored in the memory 3003. Next, using the control panel 1010, when an instruction to print the image data thus stored is issued, the apparatus executes conversion from RGB signals to YMCK signals, gamma correction and error diffusion so as to convert the image data into print data that can be printed by the printer engine 3004, and prints the data by outputting it to the printer engine 3004 using the print control unit 4007. In other words, image data, such as a digital photograph that the user wishes to print and which is input from the memory card 3011, is read out, processed, and sent to the printer engine 3004, so that the desired image can be printed.

(Direct Print from USB Device (i.e., Digital Camera, etc.) Mode)

The digital camera or other USB device 3012 and the photodirect printer 1000 according to the present embodiment are connected by a cable, and therefore image data from the digital camera or other USB device 3012 can be printed directly by the printer 1000.

In this case, a camera icon is displayed on the LCD 1006 of the control panel 1010. It should be noted that the display and the controls on the control panel 1010 for printing directly from the memory card may be disabled at this time, and the display on the viewer 1011 may be disabled as well. From this point hereafter, only the key controls on the digital camera 3012 and the image displays on the digital camera 3012 display unit (not shown) are enabled, and therefore the user can use the digital camera 3012 and order printing. In other words, when there is an instruction to print from the digital camera 3012, the photodirect printer 1000 reads the image data to be printed from the digital camera 3012, processes the image data and outputs the processed image data to the printer engine 3004, so as to enable printing of the desired image.

(Control of Power Supply to External Devices)

The photodirect printer 1000 according to the present embodiment is configured so that USB devices 3012 such as memory cards 3011 or digital cameras as external devices can be freely connected to and disconnected from the printer 1000.

In many cases, these types of external devices are supplied with power from the printer. As memory cards 3011 connectible to the present printer, there are compact flash memories, SmartMedia, Sony's Memory Stick and the like, all of which require a power supply. Recent years have seen the appearance of large-capacity memory cards with built-in compact magnetic disks. Among such memory cards as these there are some that require maximum power supplies of 500 mA, according to industry standards.

Moreover, the types of USB devices 3012 connectible to the present printer are many and varied, and range from digital cameras to CD-R/RW drives. Some of these USB devices 3012 require a power supply. These types of USB devices are permitted, under USB standards, to demand a maximum supply of 500 mA of power from connected upstream devices through a $V_{bus}$ terminal of the USB connector 1012. As a result, since the printer 1000 of the present embodiment is an upstream device with respect to a connected USB device 3012, the connected USB device might require as much as 500 mA of power from the printer side.

Given the foregoing arrangement, in order to supply power to both (for example) a memory card 3011 requiring a power supply of 500 mA maximum and a USB device 3012 requiring a power supply of 500 mA maximum when both the memory card 3011 and the USB device 3012 are simultaneously connected to the printer 1000, the printer 1000 must be provided with a power unit having the capacity to supply 5 W of power for 5V (volts) to external devices, which is a large capacity. As a result of this large-capacity requirement, the cost and the size of the power unit increase substantially, which is a drawback.

At this point, in light of what it is that the user wishes to accomplish, even with the insertion of a memory card 3011, for example, if a digital camera is thereafter connected, it is possible to think that the goal is to print out, at the printer, the image data inside the digital camera (specifically, the digital camera storage medium). Conversely, if the digital camera is connected and the memory card inserted thereafter, then it is possible to think that the goal is to print out, at the printer, the image data in the memory card.

The present embodiment focuses on the user's goal (that is, the intention) as described above and selects which of the external devices is to be supplied with power according to the operating state of the external device first connected in a situation in which a plurality of external devices are connected to the printer and there is not enough capacity to supply power to all the external devices simultaneously, thereby restricting the capacity of the power unit of the printer 1000. By so doing, it is possible to restrict the size and cost of the power unit for the printing apparatus without decreasing operability and performance.

A description is now given of the control procedure used in the present embodiment of the invention, with reference to the diagrams.

Figure 6:
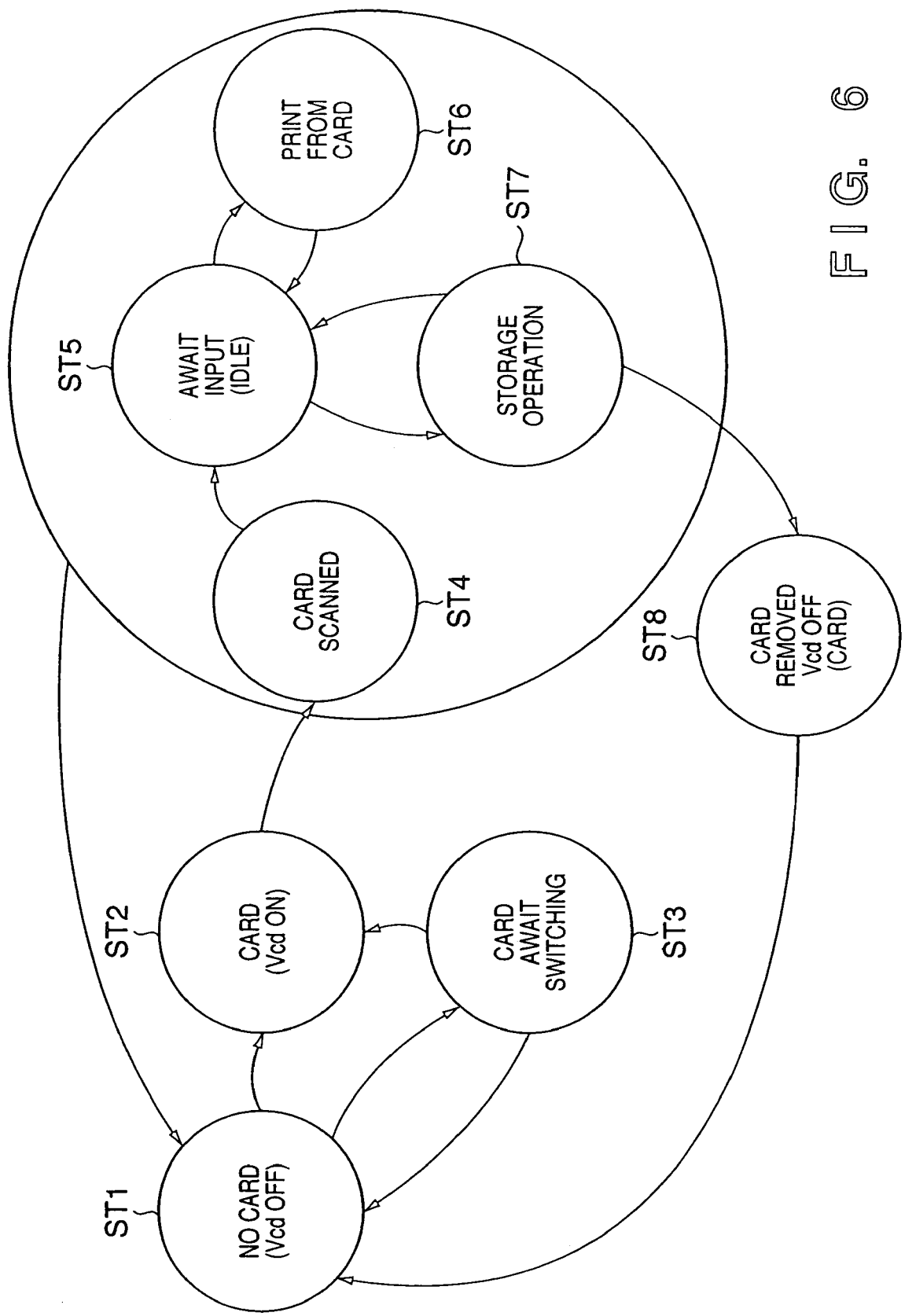
FIG. 6 is a state transition diagram showing a control procedure according to a memory card of the embodiment.
Figure 7:
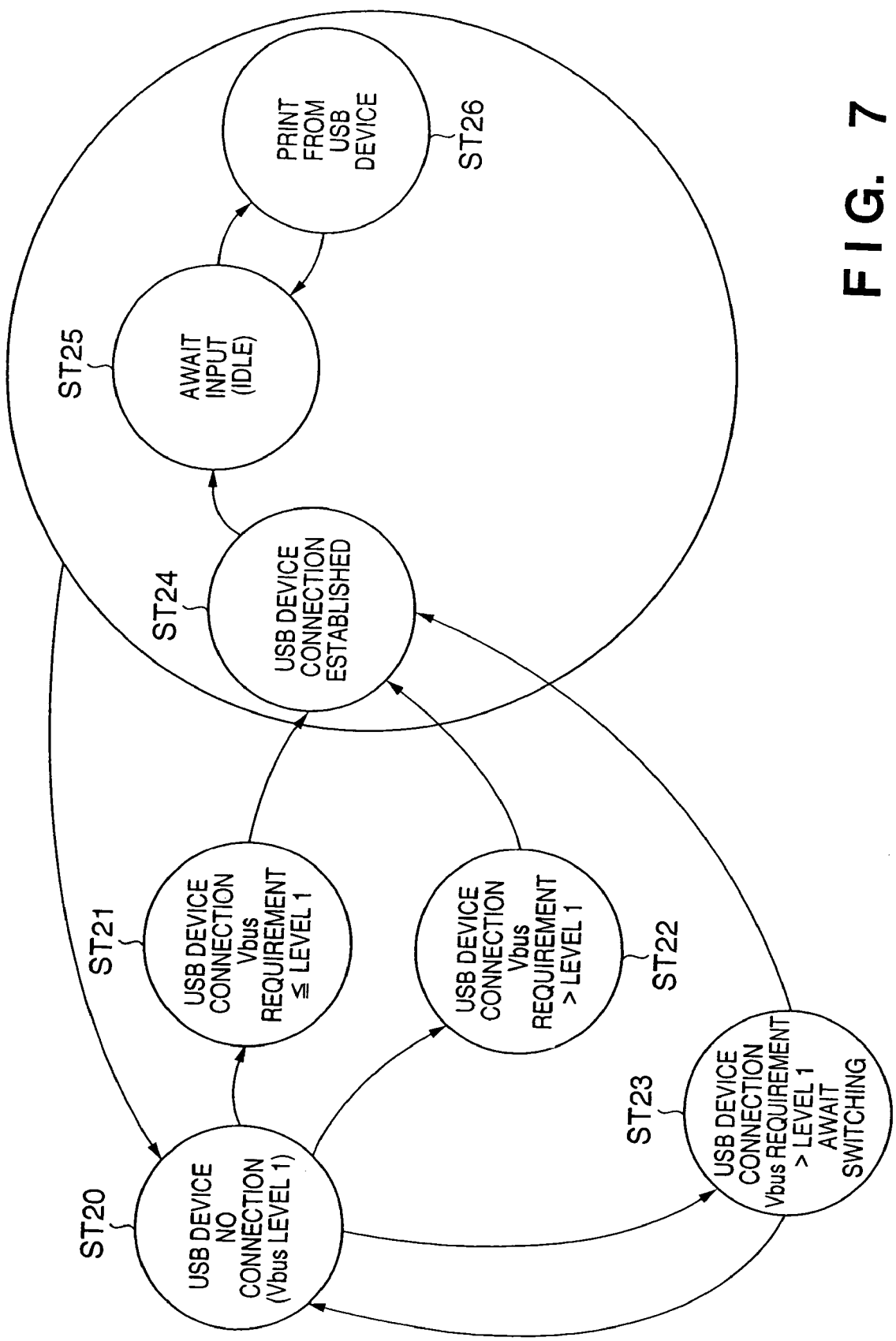
FIG. 7 is a state transition diagram showing a control procedure according to a USB device of the embodiment.

FIG. 6 is a state transition diagram showing a control procedure according to the memory card 3011 of the photo-direct printer 1000 according to the present embodiment. FIG. 7 is a state transition diagram showing a control procedure according to the USB device 3012 of the embodiment. In the diagrams, STxx denotes a single control state. When power to the printer 1000 is turned on, control starts from states ST1 and ST20 of the respective diagrams, with the control shown in FIGS. 6 and 7 carried out independently using such techniques as multitasking.

The abbreviations used in the following description of power supply control are as follows:

$V_{cd}$: Amount of power supply to memory card (approximately 5V or 3.3V, 500 mA)

$V_{ext}$: Amount of power the printer is supplying to external devices $V_{usb}$: Amount of power supplied to USB device during power supply $V_{L1}$: Level 1 of amount of power supply to USB device (approximately 5V, 100 mA)

$V_{L2}$: Level 2 of amount of power supply to USB device (approximately 5V, 500 mA)

$V_{1mt}$: Maximum amount of power the printer can supply to external devices (approximately 600 mA).

It should be noted that, although the control described below is control based on electric energy, alternatively, when the operating voltage of the memory card is the same 5V as that of the USB device, that control may be based instead on consumption current (mA).

First, a description is given of the memory card control procedure while referring FIG. 6. A state ST1 is a control state when the memory card 3011 is not inserted. At this time, in the state ST1, the supply of power to the memory card is stopped ($V_{cd}$ OFF). Insertion and removal of the memory card 3011 is detected by the memory card control unit 4001. When the memory card 3011 is inserted into the card slot 1009, the printer shifts to a state ST2 if the power supply amount $V_{cd}$ can be supplied to the memory card 3011. If, however, the USB device 3012 has already been connected and the amount of power that can be supplied to the memory card 3011 is insufficient, then the printer shifts to a state ST3.

In the state ST2, the memory card control unit 4001 checks the type and characteristics of the inserted memory card 3011, and, depending on what the memory card control unit 4001 finds, starts supplying power to the memory card 3011 ($V_{cd}$ ON), activates the memory card 3011 and moves to a state ST4.

In the state ST3, the status again shifts (moves) to the state ST2 in the case of any of (a), (b), (c) or (d) below. That is, (a) when the connected USB device is idle, (b) when the USB is disconnected, (c) when the USB device power is turned off, or (d) when the user elects to switch devices. Additionally, when the memory card 3011 is removed the printer shifts to the state ST1. It should be noted that, when the printer shifts to the state ST3, a message indicating that, for example, "The memory card and the USB device cannot be used simultaneously. Please disconnect the USB device." may be displayed on the viewer 1011.

In the state ST4, preparations for printing, such as searching the contents of the memory card 3011 and extracting a printable photographic image, is performed, after completion of which the printer shifts to a state ST5.

In the state ST5, the printer enters a standby mode, waiting for instructions to be input from the control panel 1010. When the user inputs an instruction to start printing, the status then shifts (moves) to a state ST6. If the PC 3010 is connected and there is an instruction from the PC 3010 to write to the memory card, the printer shifts to a state ST7.

In the state ST6, the printer prints out all the photographic images selected for printing. The status then returns to the state ST5 when either all printing is completed or there is an instruction to stop printing.

In the state ST7, data is written to the designated memory card, after which the status returns to the state ST5. In addition, the printer shifts to state ST8 when there is an instruction from the PC 3010 to remove the memory card.

In the state ST8, the supply of power to the memory card 3011 is stopped ($V_{cd}$ OFF) in preparation for removal of the memory card 3011. When the memory card 3011 is removed the status of the printer 1000 returns to the state ST1.

It should be noted that, in the states ST4-ST7 described above, when the memory card 3011 is removed, power supply to the memory card 3011 is subjected to an emergency shutoff ($V_{cd}$ OFF).

Next, a description is given of the USB device control procedure while referring to FIG. 7. A state ST20 is the control state in effect when either the digital camera or other USB device 3012 is not connected or the USB device power is off. In the state ST20, an amount of power equivalent to the level 1 of amount of power supply to USB device $V_{L1}$ is supplied to the (type A) USB bus connector 1012 $V_{bus}$ terminal, in preparation for detecting a USB device connection.

USB device connection/disconnection is detected by the USB HOST control unit 4004. When a USB device is connected to the (type A) USB bus connector 1012, the process of configuring to USB standard is started. The amount of power requested of the configured and connected USB device $V_{bus}$ is acquired, and, if the amount of power requested is either 0 or at or below the power supply level 1 $V_{L1}$ described above, the printer shifts to a state ST21. On the other hand, if the amount of power requested exceeds the power supply level 1 $V_{L1}$, and if the printer can supply the requested amount of power, then the printer shifts to a state ST22. However, if the requested amount of power exceeds the power supply level 1 $V_{L1}$ but the power capacity is insufficient, the printer shifts to a state ST23.

In the state ST21, supply of power supply level 1 $V_{L1}$ to the (type A) USB bus connector 1012 $V_{bus}$ terminal is started, and the printer shifts to a state ST24.

In the state ST22, supply of power supply level 2 $V_{L2}$ to the (type A) USB bus connector 1012 $V_{bus}$ terminal is started, and the printer shifts to the state ST24.

In the state ST23, if an inserted memory card is idle, or the memory card is removed, or an instruction is issued from the PC 3010 and the supply of power $V_{cd}$ to the memory card is stopped, or if the user elects to switch devices, then the printer shifts to the state S24. However, if the USB device is either removed or the USB device power is OFF, then the printer shifts to the state ST20. It should be noted that, when the printer shifts to the state ST23, a message indicating that, for example, "The USB device and the memory card cannot be used simultaneously. Please disconnect the memory card." may be displayed on the viewer 1011.

In the state ST24, preparations such as performing predetermined exchanges with the device depending on the connected USB device and establishing the protocol are performed, which, when completed, cause the printer status to shift to a state ST25.

In the state ST25, the printer 1000 enters a standby mode, awaiting the input of instructions from a control unit (not shown) of the connected USB device or the control panel 1010. When the user inputs an instruction to start printing, the printer status then shifts to a state ST26.

In the state ST26, the printer prints out all the photographic images selected for printing. The status then returns to the state ST25 when either all printing is completed or there is an instruction to stop printing.

It should be noted that, in the states ST24-ST26 described above, when the USB device is removed or the USB device power is turned off, the printer status reverts to the state ST20, that is, a state in which the USB device is not connected.

Next, a detailed description is given of the states ST1-ST3 shown in FIG. 6 and the processes in the states ST20-ST23 shown in FIG. 7, with reference to FIG. 8 through FIG. 14. It should be noted that, with respect to the variables $V_{ext}$, $V_{usb}$ and the flags FLG1, FLG2, the necessary regions of the memory 3003 are reserved in advance. Moreover, the variables $V_{ext}$ and $V_{usb}$ are reset to zero, and the flags FLG1 and FLG2 are reset, by a reset process that occurs when the printer 1000 power is turned on. FLG1 is provided in the event that the USB device connection is forcibly terminated, and is set when the connection is terminated. FLG2 is provided in the event that operations directed to the memory card are forcibly stopped, and is set when such operations are stopped.

Figure 8:
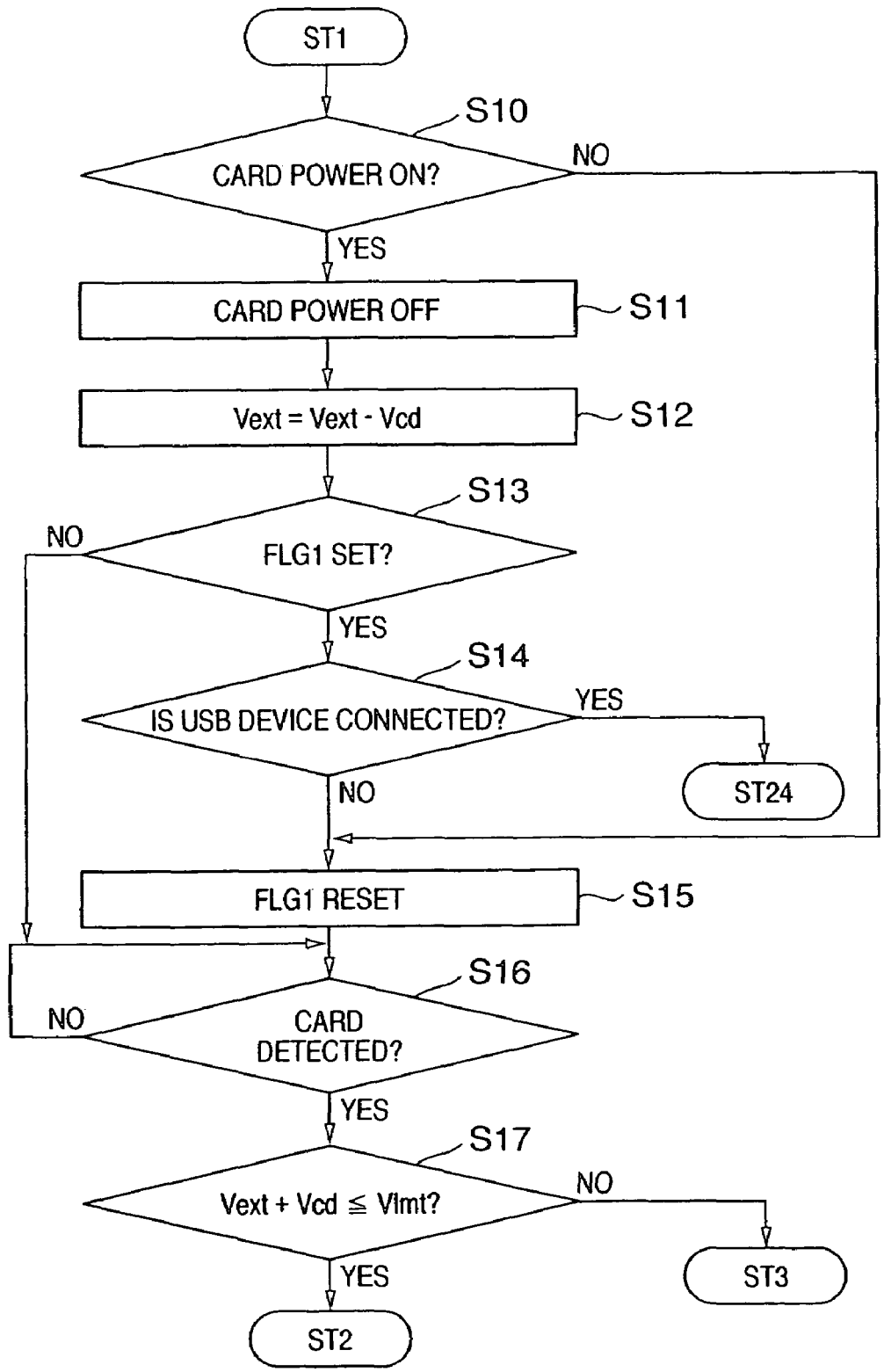
FIG. 8 is a flow chart illustrating details of control in a state ST1 in FIG. 6.

FIG. 8 is a flow chart illustrating details of control in a state ST1 in FIG. 6. The processing depicted herein is a control process executed when the memory card 3011 is not inserted.

First, in a step S10, it is determined whether or not the supply of power supply $V_{cd}$ to the memory card is being carried out. If power is being supplied, then the processes of steps S11-S14 are performed. However, these processes are intended to stop the supply of power $V_{cd}$ to the memory card if the memory card is removed and the printer status has shifted from the states ST4-ST7 to the state ST1 in FIG. 6.

Specifically, in the step S11, the power control circuit 3100 is activated, stopping the supply of power $V_{cd}$ to the memory card. Then, in the step S12, the amount of power supplied to the memory card $V_{cd}$ is subtracted from the amount of power that the printer is supplying to external devices $V_{ext}$ and the $V_{ext}$ is updated. In the step S13, it is determined whether or not the flag FLG1 is set in a step S36 to be described later, and if the flag FLG1 is not set then processing proceeds to a step S16. On the other hand, if the flag FLG1 is set, then in a step S33 to be described later the connection to the USB is forcibly terminated, and if in the step S14 a USB device is connected, the USB control state shown in FIG. 7 then shifts to the state ST24 and the connection to the USB device is reestablished.

If, in the step S10, it is determined that the supply of power to the memory card is already stopped, or if in the step S14 the USB device is not connected, then the process proceeds to a step S15 and the flag FLG1 is reset. In a step S16, the printer waits for the memory card to be inserted. When insertion of a memory card is detected, processing proceeds to a step S17, where it is determined whether or not the sum total of the amount of power $V_{ext}$ that the printer is supplying to external devices plus the amount of power supplied to the memory card $V_{cd}$ is equal to or less than the maximum amount of power $V_{1mt}$ that the printer is capable of supplying to the external devices. If the total amount of power is equal to or less than this maximum power supply amount $V_{1mt}$, then processing is completed (ended) and the printer shifts to the state ST2 shown in FIG. 6. By contrast, if the total amount of power exceeds the maximum power supply amount $V_{1mt}$, then processing is completed and the printer shifts to the state ST3 shown in FIG. 6.

Figure 9:
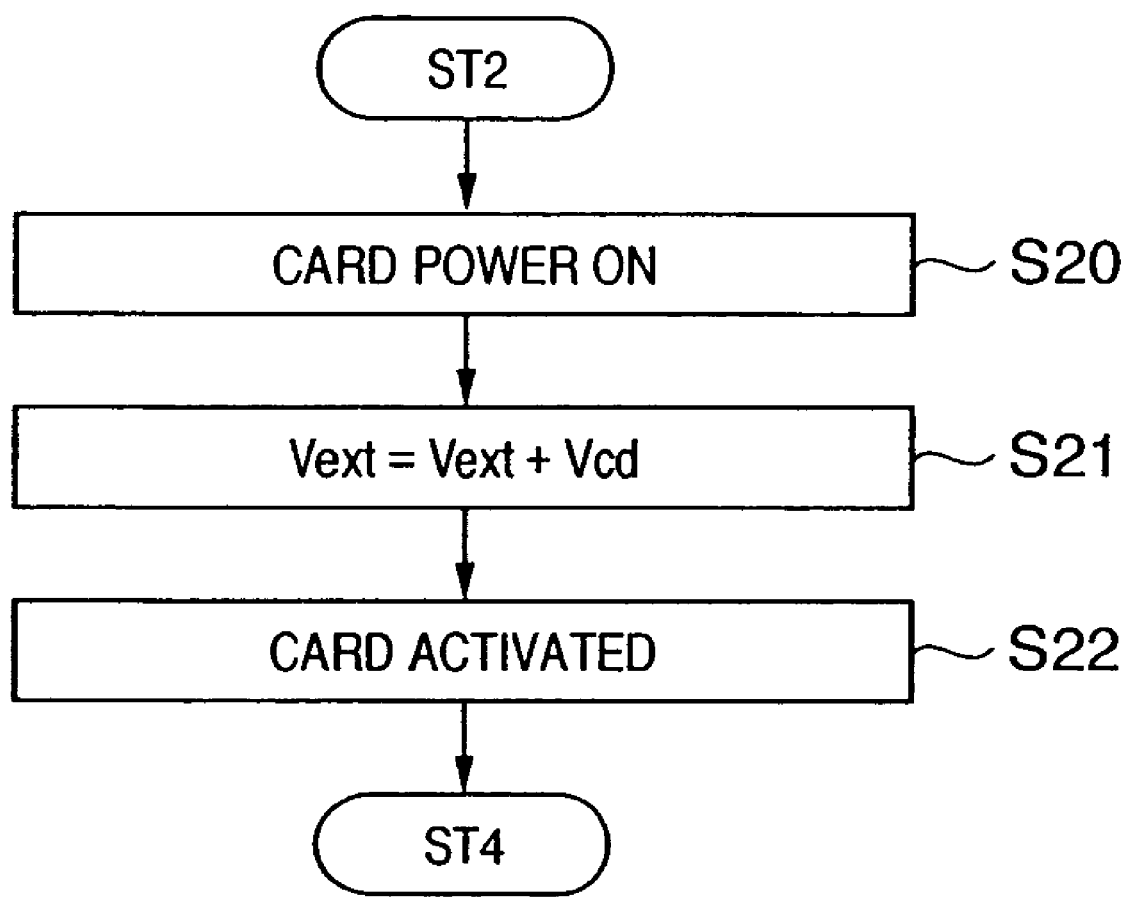
FIG. 9 is a flow chart illustrating details of control in a state ST2 in FIG. 6.

Next, FIG. 9 is a flow chart illustrating details of control in a state ST2 in FIG. 6, according to the CPU of the present embodiment. This process is intended to put the memory card into operation when a memory card is inserted.

First, in a step S20, the memory card control unit 4001 checks the type and characteristics of the inserted memory card, and, depending on what the memory card control unit 4001 finds, starts supplying power to the memory card 3011 ($V_{cd}$ ON). In a step S21, the printer adds the amount of power supplied to the memory card $V_{cd}$ to the amount of power that the printer is supplying to external devices $V_{ext}$ and updates the $V_{ext}$. Then, in a step S22, the printer activates the memory card, finishes processing, and shifts to the state ST4.

It should be noted that, although in the present embodiment the amount of power supplied to the memory card is fixed at $V_{cd}$, provided the required amount of power can be obtained by a predetermined procedure from the memory card, in the step S21 such required amount of power may be added or subtracted.

Figure 10:
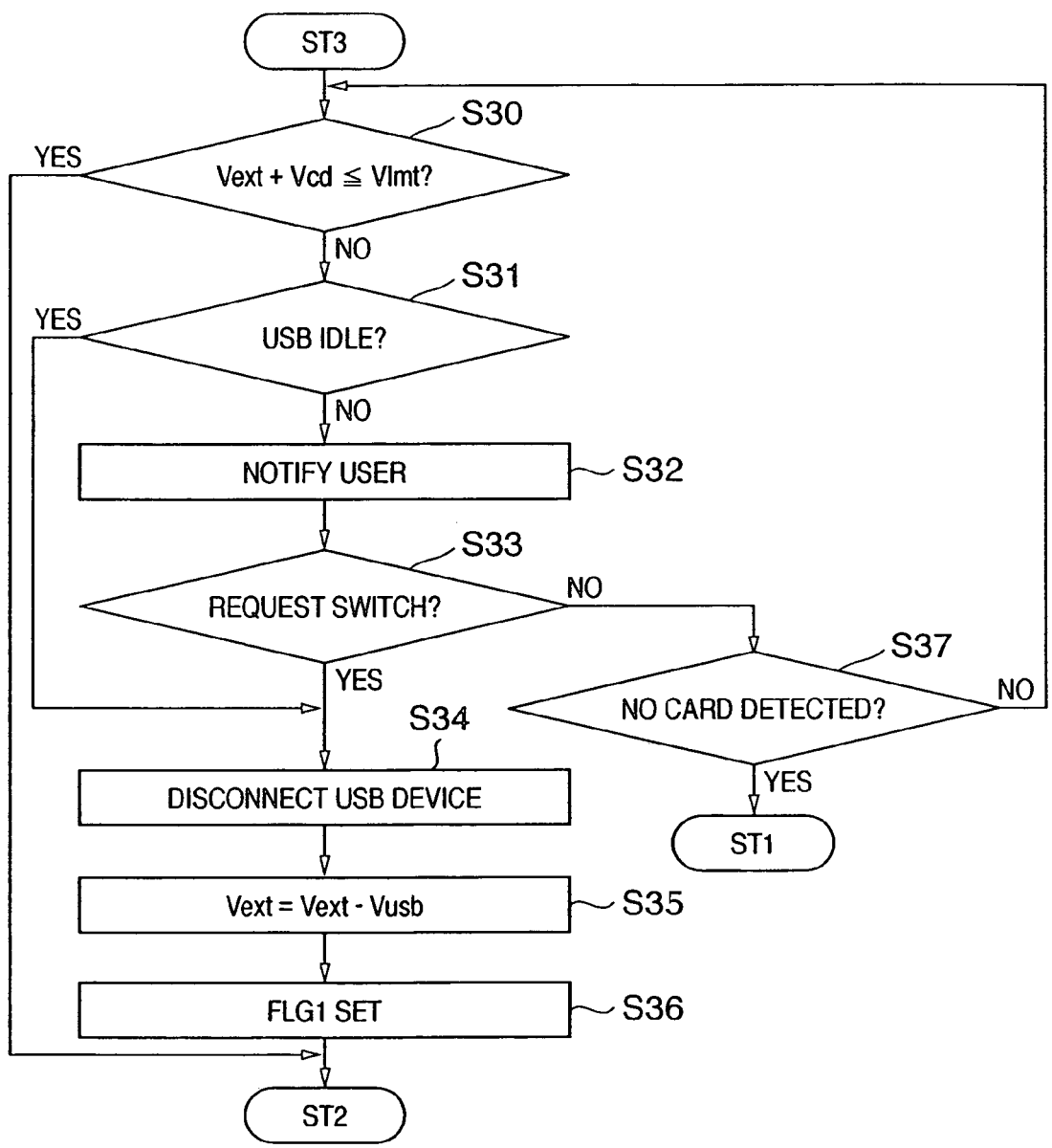
FIG. 10 is a flow chart illustrating details of control in a state ST3 in FIG. 6.

Next, FIG. 10 is a flow chart illustrating details of control in a state ST3 in FIG. 6, according to the CPU of the present embodiment. This process is a standby process, in which processing waits until the printer is able to supply power when a memory card is inserted. It should be noted that, as described above, when the printer shifts to the state ST3, a message indicating that, for example, "The memory card and the USB device cannot be used simultaneously. Please disconnect the USB device." may be displayed on the viewer 1011.

First, in a step S30, it is determined whether or not the sum total of the amount of power $V_{ext}$ that the printer is supplying to external devices plus the amount of power supplied to the memory card $V_{cd}$ is equal to or less than the maximum amount of power $V_{1mt}$ that the printer is capable of supplying to the external devices. That is, whether the total amount of sum of the power supply amount of $V_{ext}$ and the $V_{cd}$ is equal to or less than the maximum power supply amount $V_{1mt}$ is determined.

If the total amount of power is equal to or less than the maximum power supply amount $V_{1mt}$, then processing is completed and the printer shifts to the state ST2 shown in FIG. 6. This state represents a situation in which in the step S17 in FIG. 8 it has once been determined that the maximum amount of power that the printer can supply is insufficient and the USB device is removed while waiting for sufficient power supply to become available, or the USB device power is turned off.

By contrast, if the total amount of power exceeds the maximum power supply amount $V_{1mt}$, and power supply is insufficient, then in a step S31 it is determined whether or not the USB device is idle, that is, is in the state ST25 in FIG. 7. If the USB device is idle, then processing proceeds to a step S34, the printer automatically terminates the connection with the USB device and stops power supply to the USB device. Then, in a step S35, the amount of power supplied to the USB device $V_{usb}$ is subtracted from the amount of power that the printer is supplying to the external devices $V_{ext}$ and the $V_{ext}$ is updated. Next, in the step S36, when, as described above, the memory card is removed or the like, in the step S13 in FIG. 8 the flag FLG1 is set in order to automatically reestablish the connection to the USB device, processing is completed, the printer shifts to the state ST2 shown in FIG. 6 and activates the memory card.

By contrast, if it is determined in the step S31 that the USB is not idle, then in a step S32 the user is informed, or queried, that the USB device is not idle by displaying, on the control panel 1010 LCD unit 1006 and/or the viewer 1011, an icon, error code or text line, or is queried. Such display may, for example, be a text notification such as "Stop operating the digital camera.", or a text query, such as "You have inserted a memory card, but it cannot be used simultaneously with the digital camera. Do you want to switch to the memory card?" or the like.

Then, in a step S33, it is determined whether or not there is a request from the user to switch, and, if there is a request from the user to switch, as in the processes performed in the steps S34-S36 described above, the printer terminates the connection to the USB device, stops power supply to the USB device, updates the $V_{ext}$, sets the flag FLG1 for automatically reestablishing the connection to the USB device and finishes processing, shifting the printer to the state ST2 in FIG. 6 and activating the memory card.

If in the step S33 there is no request from the user to switch, then in a step S37 the state of insertion of the memory card is checked. If a memory card is inserted, then processing returns to the step S30 and the processes from that step forward are performed. If the memory card is removed, then processing is completed and the printer shifts to the state ST1 shown in FIG. 6.

Figure 11:
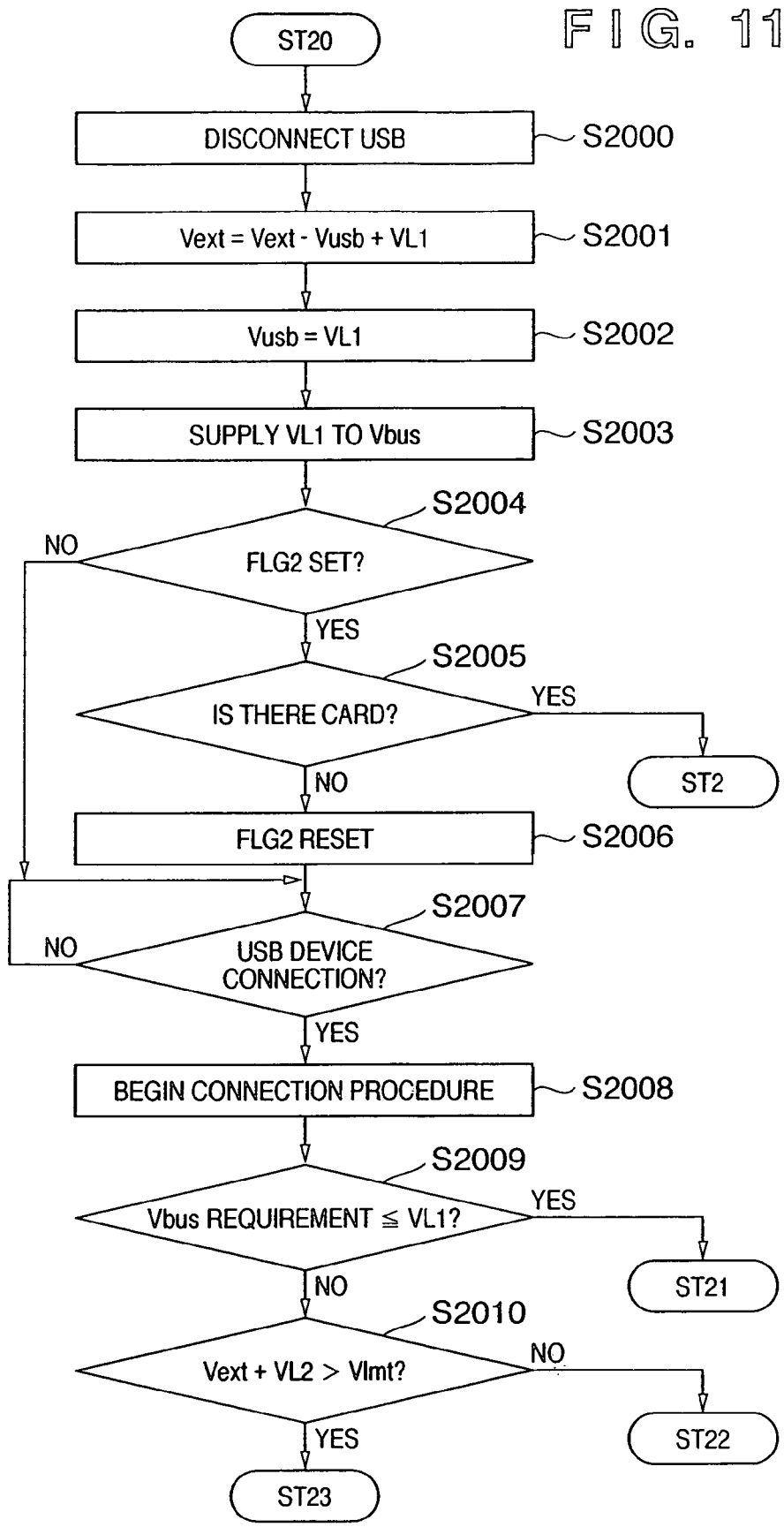
FIG. 11 is a flow chart illustrating details of control in a state ST20 in FIG. 7.

Next, FIG. 11 is a flow chart illustrating details of control in a state ST20 in FIG. 7, according to the CPU of the present embodiment.

This process is a control process, for when the digital camera 3012 or other such USB device 3012 is not connected.

As an initial matter, it should be noted that the processes performed in steps S2000-S2006 are for the purpose of terminating the connection to the USB device, if the USB device is removed or the USB device power is turned off and the printer has shifted from the states ST24-ST26 to the state ST20 in FIG. 7.

Specifically, in the step S2000, if there is a connected USB device, the connection to that device is terminated. Nothing is done if the connection has already been terminated. Next, in the step S2001, the amount of power supplied to the USB device $V_{usb}$ is subtracted from the amount of power that the printer is supplying to the external devices $V_{ext}$, the power supply amount level 1 to the USB device $V_{L1}$ is added, and the $V_{ext}$ is updated. Next, in the step S2002, the power supply amount level 1 to the USB device $V_{L1}$ is set equal to the amount of power supplied to the USB device $V_{usb}$ (that is, $V_{usb}=V_{L1}$), and in the step S2003 the printer starts to supply power corresponding to the power supply amount level 1 to the USB device $V_{L1}$ to the (type A) USB bus connector 1012 $V_{bus}$ terminal.

Next, in the step S2004, it is determined whether or not the flag FLG2 is set in a step S2308 to be described later. If the flag FLG2 is not set, then processing proceeds to a step S2007. If the flag FLG2 is set, then that means that the memory card is forcibly stopped in a step S2309 to be described later, and therefore in a step S2005 if the memory card is inserted, the memory card control state in FIG. 6 is shifted to the state ST2 and memory card operation is restarted. Then, the flag FLG2 is reset in the step S2006.

In the step S2007, the printer stands by waiting for a USB device to be connected. When the printer detects a USB device connection, in a step S2008 the printer starts to configure for the connected USB device and acquires the amount of power for the $V_{bus}$ that the USB device 3012 requests. In a step S2009, it is determined whether or not the amount of power requested by the USB device is equal to or less than the power supply amount level 1 to the USB device $V_{L1}$, and if the amount of power requested by the USB device is equal to or less than the power supply amount level 1 to the USB device $V_{L1}$, then processing is completed and the printer shifts to the state ST21 in FIG. 7. If the amount of power requested by the USB device is not equal to or less than the power supply amount level 1 to the USB device $V_{L1}$, then processing proceeds to a step S2010, where it is determined whether or not the total amount of power obtained by adding the Level 2 power supply to the USB device $V_{L2}$ to the amount of power that the printer is supplying to the external devices $V_{ext}$ is equal to or less than the maximum amount of power $V_{1mt}$ that the printer is capable of supplying to the external devices. If the sum of $V_{L2}$ and $V_{ext}$ is equal to or less than $V_{1mt}$, then processing is completed and the printer shifts to the state ST22 in FIG. 7. If, however, the sum of $V_{L2}$ and $V_{ext}$ exceeds $V_{1mt}$, then processing is completed and the printer shifts to the state ST23 in FIG. 7.

Figure 12:
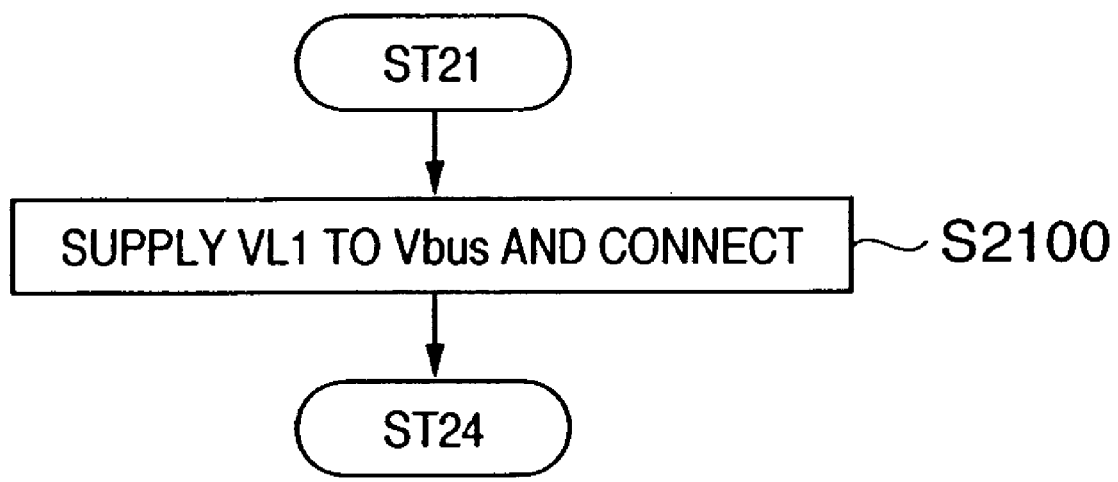
FIG. 12 is a flow chart illustrating details of control in a state ST21 in FIG. 7.

FIG. 12 is a flow chart illustrating details of control in a state ST21 in FIG. 7, according to the CPU of the present embodiment. As shown in the diagram, after the printer starts to supply the level 1 amount of power to the USB device $V_{L1}$ to the (type A) USB bus connector 1012 $V_{bus}$ terminal in a step S2100, processing is completed and the printer shifts to the state ST24.

Figure 13:
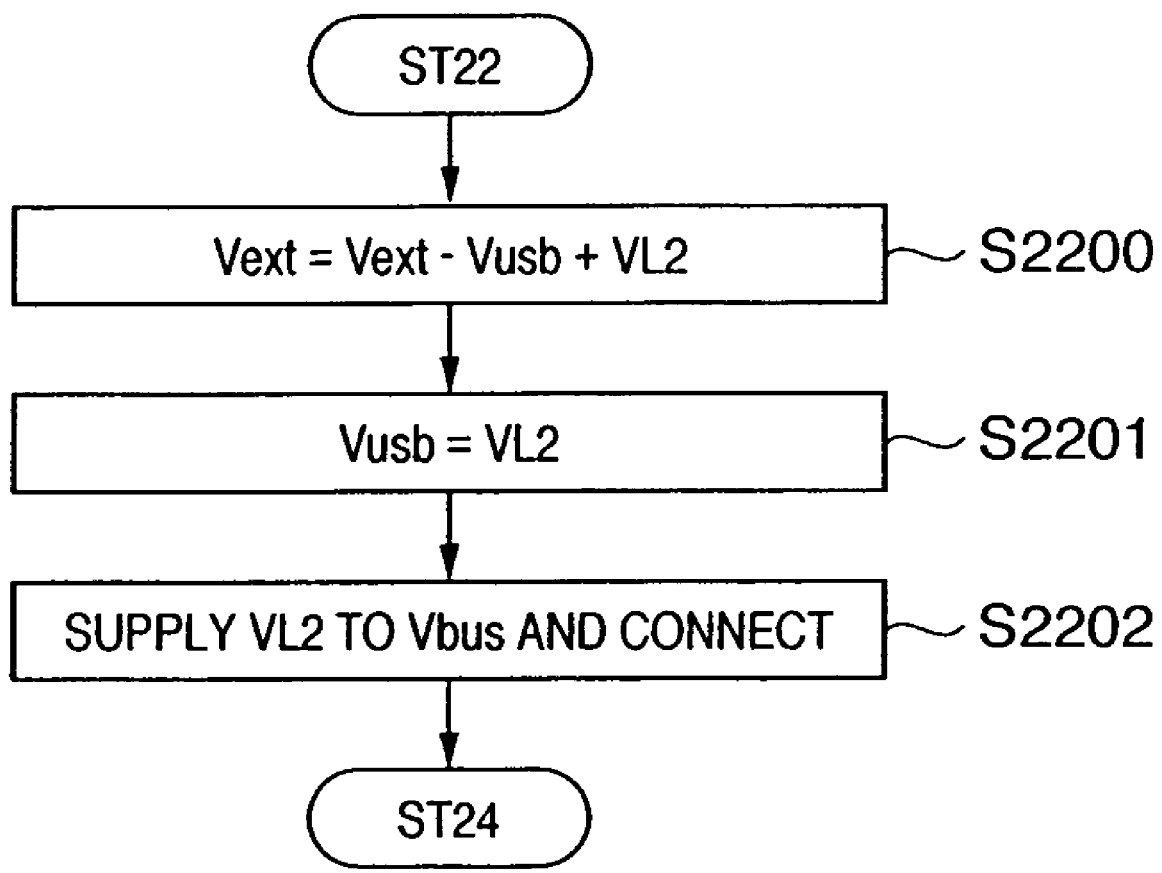
FIG. 13 is a flow chart illustrating details of control in a state ST22 in FIG. 7.

FIG. 13 is a flow chart illustrating details of control in a state ST22 in FIG. 7, according to the CPU of the present embodiment. The process is a control process for starting the supply of $V_{L2}$ level 2 power supply to the $V_{bus}$ terminal of the (type A) USB connector 1012.

First, in a step S2200, the amount of power supplied to the USB device $V_{usb}$ is subtracted from the amount of power that the printer is supplying to the external devices $V_{ext}$, to which the Level 2 power supply to the USB device $V_{L2}$ is added and the $V_{ext}$ is updated. After the Level 2 power supply to the USB device $V_{L2}$ is set equal to the amount of power supplied to the USB device $V_{usb}$ (that is, $V_{usb}=V_{L2}$) in a step S2201 and the printer starts to supply a Level 2 supply of power $V_{L2}$ to the $V_{bus}$ terminal of the (type A) USB connector 1012 in a step S2202, processing is completed and the printer shifts to the state ST24.

Figure 14:
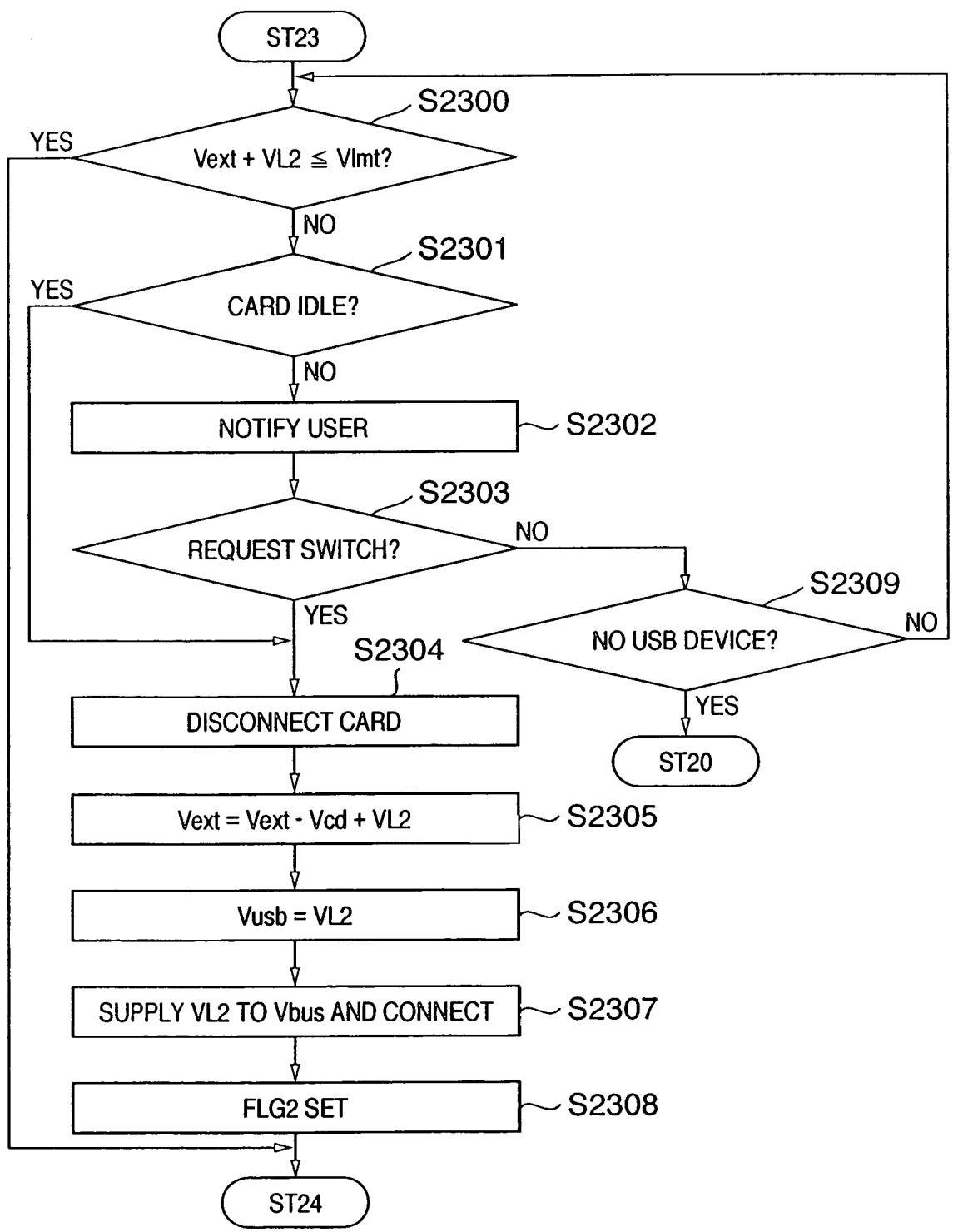
FIG. 14 is a flow chart illustrating details of control in a state ST23 in FIG. 7.

FIG. 14 is a flow chart illustrating details of control in a state ST23 in FIG. 7, according to the CPU of the present embodiment. The state ST23 is a state to which the printer shifts in any one of the following four situations (a), (b), (c) or (d): That is, (a) when an already connected memory card is inserted and is idle, (b) when the memory card is removed, (c) when there is an instruction from the PC 3010 to remove the memory card and the supply of power $V_{cd}$ to the memory card is stopped, or (d) when the user elects to switch devices. Moreover, when in the state ST23 the USB device is removed or the USB device power is turned off, the printer returns to the state ST20. In other words, this process is performed until power is supplied from the printer whenever a digital camera 3012 or other USB device 3012 is connected while the memory card is inserted. It should be noted that, when the printer shifts to the state ST23, a message indicating that, for example, "The memory card and the USB device cannot be used simultaneously. Please disconnect the memory card." may be displayed on the viewer 1011.

First, in a step S2300, it is determined whether or not the total amount of power obtained by adding the Level 2 power supply to the USB device $V_{L2}$ to the amount of power that the printer is supplying to the external devices $V_{ext}$ is equal to or less than the maximum amount of power $V_{1mt}$ that the printer is capable of supplying to the external devices. If the sum of $V_{L2}$ and $V_{ext}$ is equal to or less than $V_{1mt}$, then processing is completed and the printer shifts to the state ST24 in FIG. 7. This state represents a situation in which, in the step S2010 in FIG. 11, it has once been determined that the maximum amount of power that the printer can supply is insufficient and the memory card is removed while waiting for sufficient power supply to become available, or there is a storage control card removal instruction from the PC 3010.

On the other hand, if the sum of $V_{L2}$ and $V_{ext}$ exceeds $V_{1mt}$, indicating that the power supply capacity is insufficient, the processing proceeds to a step S2301, where it is determined whether or not the memory card is idle. If the memory card is idle, then processing proceeds to a step S2304, operation of the memory card is stopped automatically and the supply of power to the memory card is stopped. Then, in a step S2305, the amount of power supplied to the memory card $V_{cd}$ is subtracted from the amount of power that the printer is supplying to external devices $V_{ext}$, to which the Level 2 power supply to the USB device $V_{L2}$ is added and the $V_{ext}$ is updated.

After the Level 2 power supply to the USB device $V_{L2}$ is set to the USB device $V_{usb}$ (that is, $V_{usb}=V_{L2}$) in a step S2306, and the printer starts to supply a Level 2 supply of power $V_{L2}$ to the $V_{bus}$ terminal of the (type A) USB connector 1012 in a step S2307, then, in a step S2308 as described above, when the USB device is removed or the USB device power is turned off and the memory card operation should be restarted as in the step S2004 in FIG. 11, the flag FLG2 is set, and, after processing is completed, the printer shifts to the state ST24 in FIG. 7 and starts operating the connected USB device.

By contrast, if it is determined in the step S2301 that the memory card is not idle, then in a step S2302 the user is notified, or queried, by displaying, on the control panel 1010 LCD unit 1006 and/or the viewer 1011, an icon, error code or text line to that effect. Such display may, for example, be a text notification, such as "Stop operating the memory card.", or a text query, such as "You have attached a digital camera, but it cannot be used simultaneously with the memory card. Do you want to switch to the digital camera?" or the like.

Then, in a step S2303, it is determined whether or not there is a request to switch from the user. If there is such a request, then, as described above, in the steps S2304-S2308, operation of the memory card is stopped, the supply of power to the memory card is stopped, the $V_{ext}$ is updated, the supply of Level 2 power supply $V_{L2}$ to the $V_{bus}$ terminal of the (type A) USB Connector 1012 is started, and, when thereafter the USB device is removed or the USB device power is turned off, the flag FLG2 is set so as to restart operation of the memory card. Thereafter processing is completed and the printer shifts to the state ST24 in FIG. 7 and starts operation of the USB device.

If in the step S2303 it is determined that there is no request to switch, then in the step S2309 it is determined whether or not a USB device is connected. If a USB device is connected, then processing returns once more to the step S2300 and executes the processes from that step forward. If a USB device is not connected, then this state indicates that the USB device either is removed or the USB device power is turned off, and therefore the printer returns to the state ST20 shown in FIG. 7.

According to the above-described embodiment, in a printing apparatus to which a USB device and memory card can be connected as external devices, and a total amount of power required when a plurality of external devices are connected to the printing apparatus is greater than the total amount of power that the printing apparatus is capable of supplying to the external devices, the external device to which power is to be supplied can be selected according to the operating state of the first-connected external device and an operator of the printing apparatus can switch the supply of power to a desired external device as necessary.

By so doing, the size and cost of the power unit for the printing apparatus can be restricted without decreasing operability and performance, with the additional advantage of decreasing the size and cost of the apparatus as a whole.

(Variations)

Although the above-described embodiments are explained using the example of a printing apparatus to which a memory card and a USB device can be connected as external devices, the external devices are not limited to those described herein and include, for example, any device that is connected via an interface capable of supplying electrical power, such as an IEEE 1394.

Moreover, the printing method, too, is not limited to the inkjet printing method described above but may instead be any electrophotographic or thermosensible printing method.

In other words, the present invention can be adapted to any printing apparatus that can store image data and is configured so that multiple external devices that require power supply can be connected simultaneously to the printing apparatus.

Other Embodiments

The present invention can be applied to a system comprising a plurality of devices (e.g., host computer, interface, reader, printer) or to an apparatus comprising a single device (e.g. copying machine, facsimile machine).

Furthermore, the invention can be implemented by supplying a software program, which implements the functions of the foregoing embodiments, directly or indirectly, to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Examples of storage medium that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a printing medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases in which the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

If the present invention is realized as a storage medium, program codes corresponding to the above-described state transition charts shown in FIGS. 6 and 7, and/or flow charts shown in FIGS. 8 to 14, are to be stored in the storage medium.

As many apparently widely different embodiments of the present invention can be made without departing from the spirit and scope thereof, it is to be understood that the invention is not limited to the specific embodiments thereof except as defined in the appended claims.

What is claimed is:

1. A printing apparatus provided with a first interface, conforming to a first specification, connectible to a peripheral, a second interface, conforming to a second specification, connectible to a memory card, and power supply means for supplying power to the peripheral and the memory card through the first and second interfaces, respectively, the printing apparatus comprising:

peripheral control means for detecting a connection state and operation state of the peripheral, and controlling communication with the peripheral;

memory card control means for detecting a connection state and operation state of the memory card, and controlling access to the memory card;

determining means for determining whether or not a total amount of power supplied to both the peripheral and the memory card exceeds a predetermined amount of power;

power supply stop means for stopping supplying power to a previously-connected external device from among the peripheral and the memory card, based on a determination result of said determining means, and setting in a memory a flag indicating a stop of supplying power to the previously-connected external device;

monitoring means for monitoring whether or not an external device, to which power is still being supplied, from among the peripheral and the memory card, enters an idle state, based on detection results of said peripheral control means and said memory card control means;

confirmation means for confirming whether or not the previously-connected external device is connected, based on the detection results of said peripheral control means and said memory card control means; and power supply restart means for, if the flag is set, restarting supplying power to the previously-connected external device, based on a monitoring result of said monitoring means and a confirmation result of said confirmation means, wherein the first specification differs from the second specification, and the first specification includes one of a USB interface and an IEEE 1394 interface.

2. The apparatus according to claim 1, wherein the second interface includes a memory slot.

3. A power supply control method in a printing apparatus provided with a first interface, conforming to a first specification, connectible to a peripheral, a second interface, conforming to a second specification, connectible to a memory card, and power supply means for supplying power to the peripheral and the memory card through the first and second interfaces, respectively, the method comprising the steps of:

detecting a connection state and operation state of the peripheral, and a connection state and operation state of the memory card;

controlling communication with the peripheral and access to the memory card;

determining whether or not a total amount of power supplied to both the peripheral and the memory card exceeds a predetermined amount of power;

stopping supplying power to a previously-connected external device from among the peripheral and the memory card, based on a determination result of said determining step;

setting in a memory a flag indicating a stop of supplying power to the previously-connected external device;

monitoring whether or not an external device, to which power is still being supplied, from among the peripheral and the memory card, enters an idle state, based on detection results of the peripheral and the memory card in said detecting step;

confirming whether or not the previously-connected external device is connected, based on the detection results of the peripheral and the memory card in said detecting step; and if the flag is set, restarting supplying power to the previously-connected external device, based on a monitoring result in said monitoring step and a confirmation result in said confirming step, wherein the first specification differs from the second specification, and the first specification includes one of a USB interface and an IEEE 1394 interface.

* * * * *

UNITED STATES PATENT AND TRADEMARK OFFICE
CERTIFICATE OF CORRECTION

PATENT NO. : 7,424,625 B2
APPLICATION NO. : 10/800662
DATED : September 9, 2008
INVENTOR(S) : Kawanabe It is certified that error appears in the above-identified patent and that said Letters Patent is hereby corrected as shown below:

COLUMN 2:
Line 31, "respectively" should read --respective--.

COLUMN 4:
Line 30, "and" should read --an--.
Line 50, "making" should read --making them--.

COLUMN 6:
Line 32, "the LED" should read --the LEDs--.

COLUMN 10:
Line 21, "FIG. 6." should read --to FIG. 6.--.

COLUMN 11:
Line 41, "state S24." should read --state ST24.--.

COLUMN 12:
Line 16, "supply $V_{cd}$" should read --$V_{cd}$--.

COLUMN 13:
Line 28, "once" should read --first--.
Line 50, "informed, or is queried," should read --informed--.

COLUMN 15:
Line 52, "once" should read --first--.

Signed and Sealed this

Seventeenth Day of March, 2009

JOHN DOLL
*Acting Director of the United States Patent and Trademark Office*